Nov. 13, 1962 S. A. BERGMAN ET AL 3,063,079
COMBINATION VALVE AND CLEANING BALL LAUNCHER
FOR USE IN PRESSURE FLOW LINES
Filed March 31, 1960 2 Sheets-Sheet 1
*Fig. 1.*
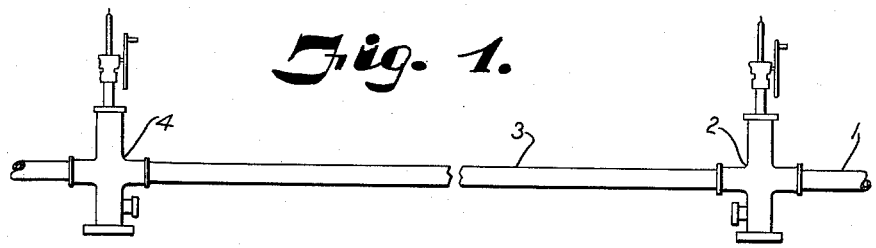
*Fig. 2.*
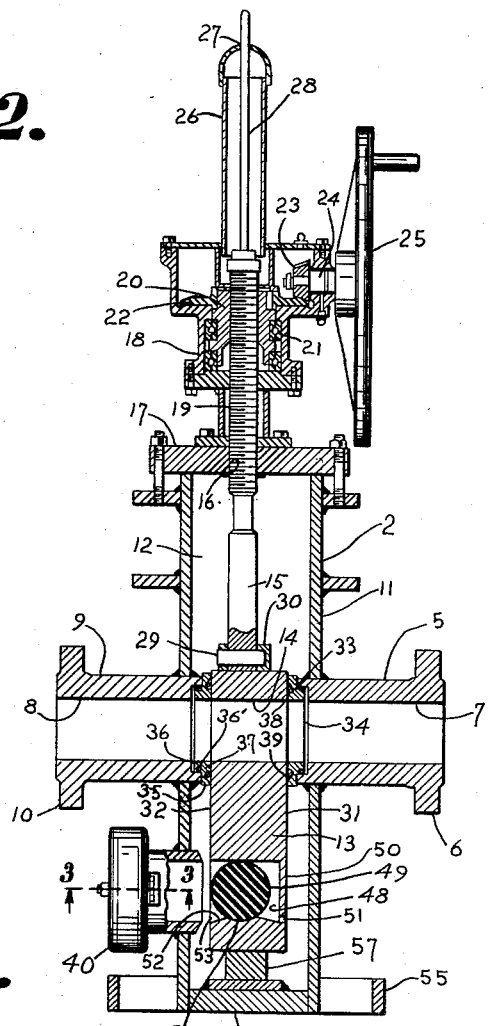
*Fig. 3.*
INVENTORS
STEPHEN A. BERGMAN &
DONALD F. COCKRELL
BY
Fishburn and Gold
ATTORNEYS Nov. 13, 1962

S. A. BERGMAN ET AL  3,063,079
COMBINATION VALVE AND CLEANING BALL LAUNCHER
FOR USE IN PRESSURE FLOW LINES

Filed March 31, 1960  2 Sheets-Sheet 2

INVENTORS
STEPHEN A. BERGMAN &
BY  DONALD F. COCKRELL

Fishburn and Gold

ATTORNEYS

United States Patent Office 3,063,079
Patented Nov. 13, 1962

3,063,079
COMBINATION VALVE AND CLEANING BALL LAUNCHER FOR USE IN PRESSURE FLOW LINES
Stephen A. Bergman, Prairie Village, and Donald F. Cockrell, Kansas City, Kans., assignors to Panhandle Eastern Pipe Line Company, Kansas City, Mo., a corporation of Delaware
Filed Mar. 31, 1960, Ser. No. 18,964
4 Claims. (Cl. 15—104.06)

This invention relates in general to fluid flow lines and the introduction and removal of pipe line cleaning devices, and more particularly to a combination valve and cleaning device launcher and catcher for use in such pressure flow lines.

In fluid pressure flow lines, such as gas and oil pipe lines, foreign material may accumulate, and some material will be deposited or adhere to the walls of the pipe lines with the result that flow therethrough is restricted. In order to remove such deposits, corrosion, foreign particles and material, it is conventional practice to insert clean-out plugs or resilient balls in the lines, and, when flow pressure is applied behind the clean-out devices or balls, it forces the devices or balls forwardly through the line, the clean-out devices or balls having engagement with the walls of the pipe line to remove deposits and force same, together with other foreign material, ahead of the clean-out device as it moves through the lines. It is also common practice to provide a plurality of valves, bypasses and branch pipes, traps and the like at each end of a section of pipe line to be cleaned for control of the flow of fluid and also to introduce and remove the cleaning device from the line. This arrangement requires great expenditure in auxiliary equipment and substantial losses in the fluid or requires the section to be taken out of service during cleaning.

The principal objects of the present invention are to provide a fitting to be inserted in the main flow line and require no special branch line, thereby removing these above-mentioned disadvantages; to provide such a fitting in the form of a full flow valve structure adapted to receive and hold a cleaning ball while allowing the fluid to continue full flow through the pipe line and movable to introduce or catch a cleaning ball and allowing the ball to progress through the pipe line with a minimum of interruption of the flow; to provide such a fitting with a valve member movable to three positions, the first of which provides full flow through the line, the second totally interrupts flow through the line, and the third position in the fitting at the upstream end of the section launches the ball cleaner into the line and in the fitting at the downstream end of the section catches the cleaning ball when it has progressed through the section being cleaned; to provide a combination valve and cleaning ball launcher in the form of a full flow gate valve wherein the valve housing has a cleaning ball entry spaced from the flow line and the valve member has a cleaning ball receiving pocket registrable with the entry in one of the positions of the valve member; and to provide such a fitting which is economical to manufacture, efficient in operation, serving as a flow control valve during the normal operations of the pipe line and as a ball launcher or catcher during cleaning operations.

Other objects and advantages of this invention will become apparent from the following description taken in connection with the accompanying drawings wherein are set forth by way of illustration and example certain embodiments of this invention.

FIG. 1 is a diagrammatic elevational view of a fluid flow pipe line with valve fitting embodying the features of the present invention at opposite ends of a pipe line section.

FIG. 2 is a vertical sectional view through the combination valve and cleaning ball launcher.

FIG. 3 is a horizontal sectional view through the cleaning ball entry on the line 3—3, FIG. 2.

Figure 4:
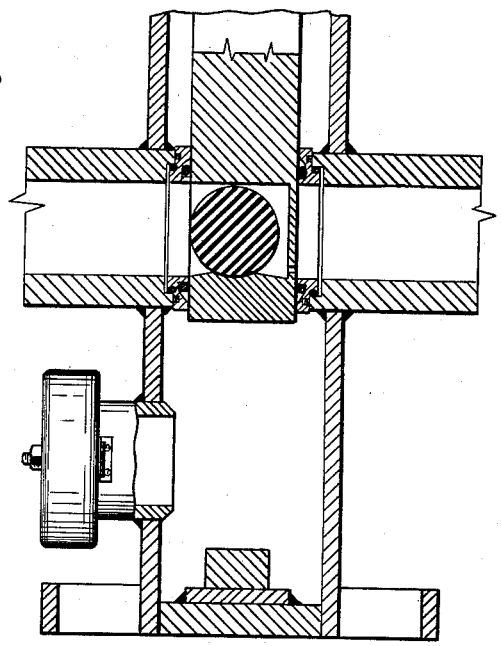
FIG. 4 is an enlarged fragmentary vertical sectional view through the valve fitting in cleaning ball launching position.

Referring more in detail to the drawings:

1 designates a fluid pressure flow line having a valve fitting and cleaning device launcher 2 at the upstream end of a section 3 and a valve fitting and cleaning device catcher 4 at the downstream end of said section, the section 3 being of any desired length between control points as, for example, 8 miles in length. The valve fittings 2 and 4 preferably are of full flow type having an inlet end 5 adapted to be connected to an adjacent end of a pipe section upstream therefrom as by flange connections 6. The inlet branch 5 has an inlet passage 7 of the same cross-sectional size and shape as the inside of the pipe 1, the passage 7 aligning with an outlet passage 8 of the same cross-sectional size and shape and in an outlet branch 9 connected to the upstream end of the pipe line section 3 by a flange connection 10. The inlet branch 5 and outlet branch 9 are oppositely disposed and fixed in a housing 11 having a chamber 12 therein in communication with the inner ends of the inlet and outlet passages 7 and 8 respectively.

A valve member 13 is movable in the chamber 12 and has a full flow bore or passage 14 extending therethrough and adapted to register with the inlet and outlet passages 7 and 8 when the valve member is in one position, as illustrated in FIG. 2. In the illustrated structure, the valve fitting 2 is of the general form of a gate valve wherein the housing 11 and chamber 12 therein are elongated, and the valve member 13 forms a gate confined within and movable to its different positions in said chamber, said valve member being actuated by any suitable operating structure. In the structure illustrated, the valve member 13 has a stem 15 extending upwardly therefrom through a bore 16 in a cover plate 17 which carries a valve bonnet 18. The stem 15 has a threaded portion 19 threaded in a rotatable nut 20 rotatably carried on bearings 21 in the bonnet, said nut having a gear 22 fixed thereto and engaged by a gear pinion 23 fixed on a shaft 24 of a hand wheel 25 whereby rotation of the hand wheel will turn the nut 20 to effect movement of the stem 15 and the valve member 13 thereon. The bonnet 18 has an upper extension 26 with an opening 27 in the upper end thereof through which a gauge rod 28 extends whereby the portion of the gauge rod extending from the upper end of the extension 26 will indicate the position of the valve member relative to the inlet and outlet flow passages 7 and 8. In the illustrated structure, the stem 15 is removably connected to the valve member 13 by a pin 29 extending into a collar 30 fixed on the upper end of said valve member 13.

The valve member 13 has opposite flat faces 31 and 32 adapted to be engaged by suitable seal means 33 which encompass or encircle the inner ends of the inlet and outlet passages 7 and 8. In the illustrated structure, the inner ends of the branches 5 and 9 have recesses 34 and seal members or rings 35 have portions 36 extending into said recesses with resilient rings 36' having a sealing engagement therebetween to effect a fluid seal. The inner faces 37 of the rings 35 are preferably flat and substantially engage the faces 31 and 32 of the valve member with seal rings 38 arranged in grooves 39 in said rings to effect a seal between the faces 37 and the faces 31 and 32 whereby the seal members form an effective seal between the housing or inlet and outlet branches 5 and 9 thereof and the valve member 13 in the various positions of the valve member.

A cleaning device entry 40 is arranged in the housing 11 and spaced from the outlet branch 9 in a direction longitudinally of the path of movement of the valve member 13. In the structure illustrated, the entry consists of an outwardly extending portion 41 having a bore 42 arranged parallel with the passage 8 and communicating with the chamber 12. The outer open end 43 of the bore 42 is normally closed by a cover 44 removably mounted on the member 41. In the illustrated structure, the cover member is swingably mounted by hinge means 45 and is secured in closed position by a suitable fastening device such as a bolt 46 pivoted on the portion 41 and nut 47 threaded on said bolt in engagement with said cover member. A gasket member 44' is interposed between the cover 44 and member 41 to provide a fluid-tight seal therefor. When the valve member 13 is in its first position for full flow through the fitting 2, as illustrated in FIG. 2, a pocket 48 in said valve member 13 registers with the bore 42 whereby when the cover 44 is removed to provide access through the bore 42 to the chamber 12, a cleaning ball or device 49 may be inserted through the bore 42 into the pocket 48. The cleaning device or ball 49 is preferably substantially the same diameter as the bore or passages 7 and 8 and the bore through the pipe line. The pocket 48 opens from the side of the valve toward the bore 42 and terminates short of the opposite face of said valve member, forming a wall 50 which has a through port 51 in the lower portion thereof communicating with said pocket. The lower portion of the pocket 48 preferably has an upwardly inclined surface 52 from the open end 53 thereof terminating in a recess 54 to engage the cleaning device and provide resistance to movement of said cleaning device from said pocket. It is preferable that the pocket 48 be spaced from the valve bore 14 a distance greater than the diameter of said bore 14 whereby the intervening portion of the valve member forms a closure to stop flow through the fitting 2 when said valve member is in its second position, which is substantially intermediate its open position and ball launching position.

When the valve member is actuated to move the valve member 13 to the third position, the open end 53 of the pocket 48 will register with the passage 8 and flow from the upstream side through the passage 7 will flow through the port 51 to apply pressure behind the cleaning device or ball 49, forcing same from its retaining recess for movement through the passage 8 and through the section 3 of the pipe line, the port 51 being at the bottom of the pocket or moving into communication with the inlet passage 7 only as the pocket moves into registry with the outlet passage 8 prevents any application of pressure behind the cleaning device or ball 49 until substantial registry is obtained. Engagement of the ball in the recess 54 retains the ball in the pocket until pressure forces same therefrom. The fitting 2 has a suitable base portion 55 and a bottom wall 56 closing the lower end of the chamber 12 whereby said valve member is confined within said chamber. It is preferable that a stop 57 be arranged in the lower portion of the chamber to engage the lower end of the valve member 13 when the valve member is in its first position or for full flow through said valve member.

Figure 5:
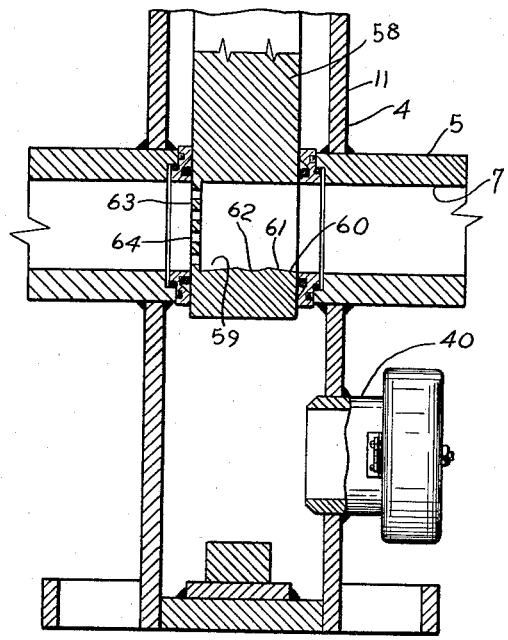
FIG. 5 is an enlarged fragmentary vertical sectional view through a modified form of the valve fitting in cleaning ball catcher position.

In the form of the invention illustrated in FIG. 5, the structure is a gate valve and cleaning device catcher wherein the housing 11 and valve operating structure are the same as the valve and launcher structure illustrtaed in FIG. 2, except that the cleaning device entry and removal portion 40 is on the opposite side of the housing or on the side thereof toward the upstream portion of the pipe line, and the gate valve member 58 has a ball receiving pocket 59 with the open end 60 registering with and on the side toward the passage 7 of the inlet branch 5. The lower portion of the pocket 59 has an upwardly inclined portion 61 and a recess 62 to engage the ball as it enters the pocket to retain same therein. The pocket 59 terminates short of the opposite side of the valve 58 with a wall 63 forming an obstruction to prevent the ball from passing through to the outlet side of the structure. The wall 63 has a plurality of perforations 64 or other openings of suitable total area to provide small restriction to normal flow through the valve structure when the valve member 58 is in the ball receiving position as illustrated in FIG. 5.

In using a structure as illustrated and described, with the cleaning device launcher 2 and catcher 4 positioned at the ends of a pipe line section 3, as illustrated in FIG. 1, and with the valve members 13 and 58 in full flow or first position, the flow of fluid through the pipe line would be with normal operation. If it is desired to stop flow of the fluid through the pipe line at either of the positions at the ends of the section 3, the respective valve member may be actuated to move same to its intermediate position closing the flow from the inlet passage 7 to the outlet passage 8. When it is desired to clean the section 3, the valve member of the launcher 2 is moved to full flow position, as illustrated in FIG. 2, and then the cover 44 is removed from the entry 40, and the cleaning ball inserted through the bore 42 into the pocket 48. The cover 44 of the ball launcher is then secured in place. Then the ball catcher structure 4 is actuated to move the valve member 58 to the ball catching position as illustrated in FIG. 5. The hand wheel 25 is rotated to rotate the nut 20, raising the valve member 13 until the pocket 48 moves into registry with the outlet passageway 8 and, at the time of registry, fluid from the inlet passage 7 will flow through the port 51 to apply pressure behind the cleaning ball 49 forcing same from the pocket 48 through the passageway 8 and into the bore of the pipe line section 3. After the ball has started on its travel through the pipe line section, the hand wheel 25 is rotated to cause the valve member 13 to move downwardly to return said valve member to the first position for full flow through the bore 14 to apply the full flow behind the ball, forcing same through the pipe line section 3 until it enters the pocket 59 of the catcher 4. It is possible to tell by the sound, as well as accurate calculations, as to the movement of the ball through the pipe line section so as to know when it is received in the catcher pocket 59. Also, when the ball is received in the pocket 59, flow therethrough will be substantially interrupted, and thereupon the valve member 58 is actuated to move same to the first position or full flow position through the catcher 4, at which position the pocket 59 registers with the bore 42 of the entry 40 in said catcher 4, and the respective cover 44 may be removed to provide access through the bore 42 whereby the cleaning ball can be removed from the pocket 59 in the structure and then the cover 44 returned to closed sealed position for normal operation of the pipe line.

It is to be understood that while we have illustrated and described certain forms of our invention, it is not to be limited to the specific forms or arrangements of parts herein described and shown except insofar as such limitations are included in the claims.

What we claim and desire to secure by Letters Patent is:

1. A device for controlling flow in a pipe line and for introducing a cleaning device into said pipe line comprising, a valve housing having an elongate chamber therein and aligned inlet and outlet passages of substantially corresponding size intersecting said chamber, a valve member within and movable in said chamber and having a through bore the same size and registrable with said inlet and outlet passages in one position of said valve member for full line flow, said valve member having a second bore spaced from the first-named bore and having one end registrable with one of said passages when the valve member is moved to a second position, means in said second bore adjacent the other end thereof restricting flow therethrough, said second bore between said one end and the flow restricting means being of a size to receive a cleaning device therein, means in said valve member adjacent said one end of said second bore for frictionally engaging a cleaning device to resist movement thereof from said second bore, a cleaning device entry passage in said housing with one end of said entry passage opening exteriorly of the housing and another end communicating with said chamber and registering with said one end of said second bore when the valve member is in said first position for inserting and removing a cleaning device in said second bore while full flow in a pipe line is permitted through the first-named bore, a closure member normally closing said one end of the cleaning device entry passage and removable for access thereto, the spacing between the first and second-named bores in the valve member being greater than the diameter of said bores whereby flow through the passages is closed when the valve member is in a third position, means sealingly engaging the housing and valve member in encircling relation to said passages, and actuating means for selectively moving said valve member to the first, second and third positions.

2. In an apparatus of the character described comprising, a housing having inlet and outlet passages therein and adapted for communicating connection in a flow line, said housing having an elongate chamber disposed between said inlet and outlet passages, a valve member within said housing chamber and movable therein between first and second and third positions, said valve member having a full flow passage therethrough with ends registrable with said inlet and outlet passages when said valve member is in said first position, said housing having a cleaning ball entry passage with one end thereof connected with said chamber in spaced relation to said outlet passage and another end exteriorly of said housing, a closure member normally closing said other end of the entry passage and removable for access thereto, a cleaning ball receiving pocket in said valve member and having an open end registering with said cleaning ball entry passage when said valve member is in said first position, said open end of said ball receiving pocket registering with said outlet passage when said valve member is in said third position, said pocket having another end in the valve member spaced from said open end whereby a cleaning ball received in said pocket is positioned within said pocket, a port in said valve member and extending from said other end of said pocket at the trailing portion thereof as said valve member is moved to the third position for connecting said other end of the pocket with the inlet passage only when the valve member is moved substantially to said third position whereby flow pressure through said port forces the cleaning ball into said outlet passage, said valve member closing flow through said housing between the inlet and outlet passages when said valve member is in said second position, and actuating means connected with said valve member for selectively moving same to said first, second and third positions.

3. In an apparatus of the character described comprising, a housing having inlet and outlet passages therein and adapted for communicating connection in a flow line, said housing having an elongate chamber disposed between said inlet and outlet passages, a valve member in said housing chamber and movable therein between first and second and third positions, said valve member having a full flow passage therethrough with ends registrable with said inlet and outlet passages when said valve member is in said first position, said housing having a cleaning ball entry passage spaced from said outlet passage, a cleaning ball receiving pocket in said valve member and registering with said cleaning ball entry passage when said valve member is in said first position, said ball receiving pocket having an open end registering with said outlet passage when said valve member is in said third position, means in said pocket for restricting same adjacent said open end for frictionally engaging said ball to resist movement of the ball from said pocket, a port in said valve member connecting said pocket with the inlet passage only when the valve member is moved substantially to said third position whereby flow pressure through said port overcomes said resistance to movement of the ball and forces the ball into the outlet passage, said valve member closing flow through said housing between the inlet and outlet passages when said valve member is in said second position, and actuating means connected with said valve member for selectively moving same to said first, second and third positions.

4. In an apparatus of the character described comprising, a housing having inlet and outlet passages therein and adapted for communicating connection in a flow line, said housing having an elongate chamber disposed between said inlet and outlet passages, a valve member within said housing chamber and movable therein between first and second and third positions, said valve member having a full flow passage therethrough with ends registrable with said inlet and outlet passages when said valve member is in said first position, said housing having a cleaning ball entry passage with one end connected with said chamber in spaced relation to said outlet passage and another end opening exteriorly of said housing, closure means mounted at said other end of the entry passage and movable for access thereto, a cleaning ball receiving pocket in said valve member and registering with said cleaning ball entry passage when said valve member is in said first position, said ball receiving pocket having an open end registering with said outlet passage when said valve member is in said third position, means restricting the open end of said pocket providing resistance to movement of said ball from said pocket, a port in said valve member connecting said pocket with the inlet passage only when the valve member is moved substantially to said third position whereby flow pressure through said port overcomes the resistance to movement of said ball and forces said ball from the pocket into the outlet passage, said valve member closing flow through said housing between the inlet and outlet passages when said valve member is in said second position, means in said housing encircling the inlet and outlet passages and sealingly engaging said valve member in each of the first, second and third positions, and actuating means connected with said valve member for selectively moving same to said first, second and third positions.

References Cited in the file of this patent

UNITED STATES PATENTS

| | | |
|---|---|---|
| 384,885 | Mathis | June 22, 1897 |
| 682,985 | Gray | Sept. 17, 1901 |
| 1,633,161 | Cavenagh | June 21, 1927 |
| 2,493,504 | Roberts | Jan. 3, 1950 |
| 2,601,304 | Lane | June 24, 1952 |
| 2,713,909 | Baker | July 26, 1955 |
| 2,873,086 | Bryant | Feb. 10, 1959 |
| 2,893,028 | Scaramucci | July 7, 1959 |

FOREIGN PATENTS

| | | |
|---|---|---|
| 309,344 | Great Britain | Apr. 11, 1929 |